United States Patent Office 3,420,739
Patented Jan. 7, 1969

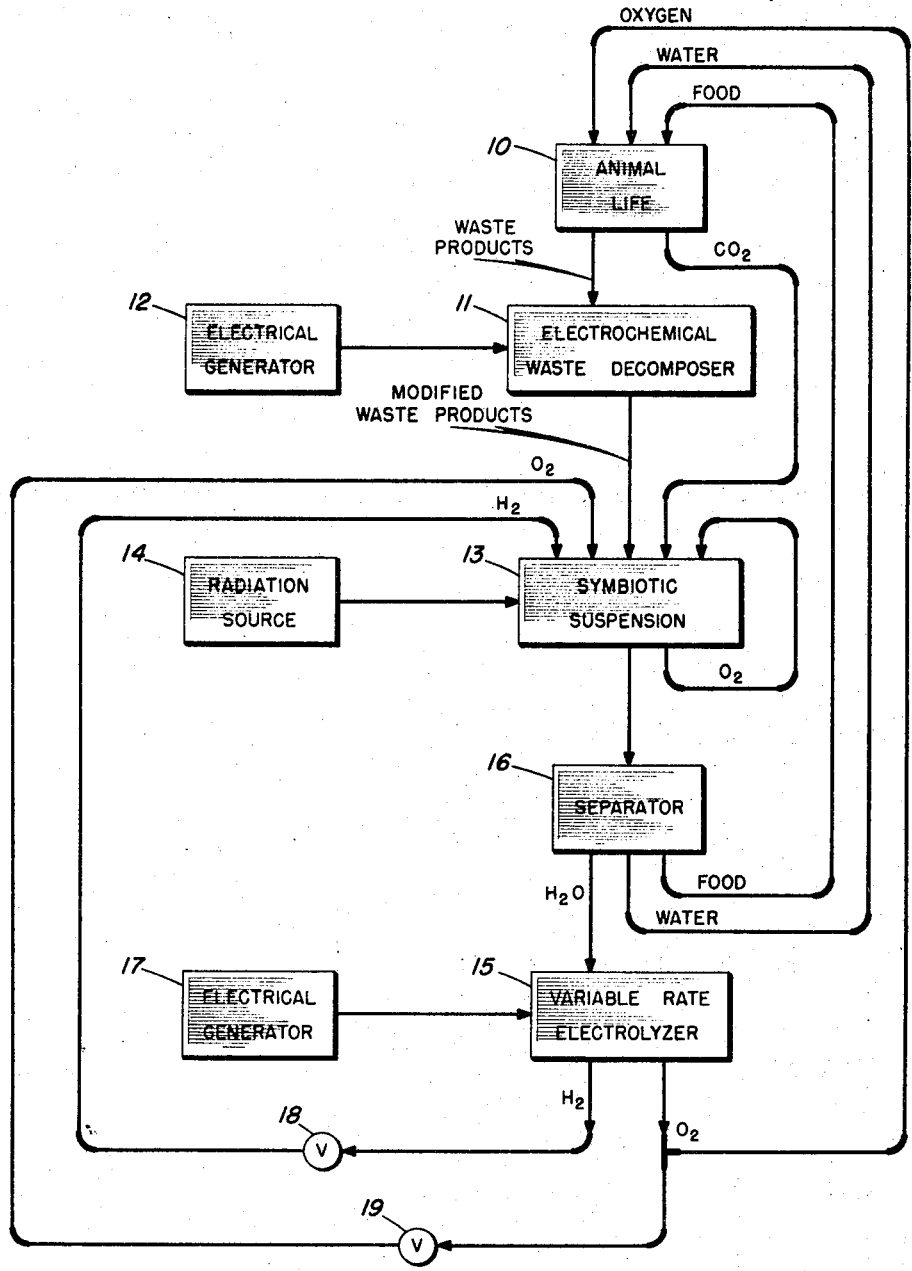

3,420,739
CLOSED ECOLOGICAL SYSTEM FOR THE SUPPORT OF ANIMAL LIFE AND THE METHOD THEREOF
Leonard H. Bongers and Bessel Kok, Baltimore, Md., assignors to Martin-Marietta Corporation, New York, N.Y., a corporation of Maryland
Filed Sept. 23, 1963, Ser. No. 310,734
U.S. Cl. 195—1                        5 Claims
Int. Cl. C12b 1/00

This invention relates to closed ecological systems for the support of animal life contained within and functioning as part of such systems. More particularly, this invention concerns high efficiency symbiotic ecological systems capable of sustaining animal life in environments essentially hostile to animal life.

The ecological systems described herein may find utility not only in remote terrestrial desert areas, but also in space vehicles on extended missions or in stations or colonies based on the moon or on other celestial bodies.

Typical proposals for closed ecological systems to function in such areas have envisioned the use of photosynthetic plant life such as algae operating in an aqueous medium supplied with the chemical wastes of animal life. As previously proposed such systems have postulated a simple mutual dependency of animal life upon plant life and of plant life upon animal life. The animal wastes provide the raw materials for the support of the plant life, which materials are metabolized through the use of energy derived from solar radiation or, if solar radiation is unavailable, of energy from artificial light sources. In turn, the products of plant metabolism are supplied as food and oxygen for the support of the animal life, water being conserved within the system. The simplicity of such systems has been more apparent than real because of the fact that the efficiency of the photosynthetic conversion is low, if electrical energy is required to supply the necessary radiation during periods when solar radiation is unavailable. The energy requirements of such systems therefore dictate the use of very large sources of electrical power which tend to increase the cost, size and mass of the ecological system.

It is an object of this invention to provide a closed ecological system which is capable of operating with high efficiency of energy utilization to support animal life within the system under conditions of widely varying availability of naturally occurring radiation.

A further object of the invention is to provide a novel method for the efficient production of food and other essential substances for the support of animal life in a closed environment.

A further object of this invention is to provide a new ecological method and system employing symbiotic cultures of photosynthetic and chemosynthetic organisms for the support of animal life in a closed environment.

A still further object of this invention is to provide a novel culture of mixed symbiotic organisms capable of scavenging carbon dioxide in a closed ecological system and of converting it efficiently into organic foodstuffs.

By way of a brief summary of the invention in one of its aspects there is provided an aqueous suspension or culture including a symbiotic mixture of chemosynthetic hydrogen bacteria, such as Hydrogenomonas, with photosynthetic organisms, such as algae, in a nutrient medium consisting largely of animal wastes or its derivatives. The chemosynthetic and photosynthetic organisms scavenge carbon dioxide, nitrogen bearing compounds and other waste products of animal life and convert these products by metabolic processes into substances suitable for sustaining the animal life within the system.

The mixture is illuminated by solar radiation, when it is available, to provide an energy input for the growth of the algae within the mixed suspension. Hydrogen is also supplied to the mixed culture through the electrolysis of water in order to support the growth of the Hydrogenomonas within the mixture. Most of the oxygen resulting from the electrolysis of water is supplied for respiration to the animal life within the system, but some of the oxygen is also supplied to the mixed culture. The rate of electrolysis and the rate of supply of hydrogen and oxygen to the mixed culture is made to depend upon the available solar radiation, being increased during periods when solar radiation declines or becomes unavailable altogether.

Although the scope of this invention is not to be limited except by the appended claims, further details of the invention as well as additional objects and advantages will be better understood with reference to the accompanying drawing which depicts in schematic form a closed ecological system for the support of animal life contained therein according to the principles of this invention.

In the figure the several functional elements of the system are depicted in block form with arrowheaded lines to indicate the flow of substances between portions of the system and the inputs of energy into the system. In a system of the type to which the present invention is directed, it is customary to consider the animal life contained within the system as a functional part of the system itself. In the figure, therefore, the animal life is depicted as a functional element 10 having inputs, outputs and functional relationships with other parts of the system.

The animal life 10 through the metabolism of substances with which it is supplied will in the normal course of events produce a certain bulk of waste products, including carbon dioxide, urine and feces. In a closed ecological system capable of existing and functioning in remote surroundings hostile to life, these waste products cannot be disposed of. They must enter into the total cycle of functional relationships to be conserved and transformed through some means into useful substances which will contribute to the support of the life cycle in the system. The first step in the transformation of the animal wastes in the depicted system is the introduction of these wastes into a decomposer 11 which is preferably of the electrochemical variety. The passage of an electrical current through a solution of the waste products will operate to convert these wastes into a number of materials, including carbon dioxide, ammonia, inorganic salts, and, to some extent, molecular hydrogen and oxygen. This decomposition is preferably done on a batch basis. That is, an entire batch of animal wastes are digested by the waste decomposer 11 and passed on to the next element of the system before a new batch of waste products is introduced into the waste decomposer. The energy for the electrochemical decomposition which takes place is provided by an electrical generator 12 deriving its energy from such sources as may be convenient or desirable. The electrical generator 12 should preferably have a low specific weight factor; that is, the ratio of mass to energy ouptut should be as low as possible. Small atomic reactors may possess certain size and mass economies in remote or inaccessible regions to which the system might be transported.

The products of the electrochemical decomposition which takes place in the decomposer 11 are dispensed into the next stage 13 of the system, designated as a symbiotic suspension. In the practice of this invention the symbiotic suspension 13 includes two basic types of life form. One of the types employed is a chemosynthetic organism capable of metabolizing carbon dioxide with hydrogen and oxygen. The other type of life form employed is a photosynthetic organism capable of using radiant energy for the conversion of carbon dioxide and water into organic compounds and oxygen. We have found that organisms of these types are generally quite compatible. As will be seen, the chemosynthetic organisms may, under certain conditions, actually depend in part upon the photosynthetic organisms. The radiation utilized by the photosynthetic organisms does not affect the metabolism of the chemosynthetic organisms, and the presence of the generally colorless chemosynthetic organisms does not interfere with the light penetration of the suspension or culture. Neither does the presence in the suspension of the hydrogen necessary to the chemosynthetic organisms affect the growth of the photosynthetic organisms.

Many soil bacteria are facultative heterotrophs living heterotrophically in the soil but capable of growth in purely inorganic media when hydrogen, oxygen and carbon dioxide are supplied. Researches have indicated that there is a wide distribution of normally heterotrophic but potentially hydrogenoxidizing bacteria in all soils. One example of such bacteria is *Hydrogenomonas pantotropha*. In the practice of this invention, however, we prefer to use autotrophic hydrogenomonads of the species designated *Hydrogenomonas eutropha* or *Hydrogenomonas eutropha* or *Hydrogenomonas tacitus*. According to current scientific knowledge, these bacteria are the simplest and most efficient carbon dioxide-assimilating biological systems known to man. As photosynthetic organisms we prefer to employ algae. Both the hydrogenomonads and the algae thrive together in aqueous solutions including typical waste products of animal life.

As has previously been indicated, the mixed culture of chemosynthetic and photosynthetic organisms is grown as a source of nutrition for the animal life within the system. In addition to the animal wastes and, if desired, other inorganic compounds introduced into the medium on which the culture subsists, the culture is also supplied with radiation for the photosynthetic conversion from source 14 and with hydrogen for the chemosynthetic conversion from electrolyzer 15. At periodic intervals fractions of the suspension are divided and introduced into separator 16 for the removal of water therefrom. Separator 16 may take many forms. It might, for example, have associated with it as a part thereof a centrifuge for removing excess water from the mixtures supplied to it and means for drying and compressing the solid foods contained within the suspension prior to dispensing these solids as foods to the animal life 10 in the system. Some of the water from the separator is also supplied, as indicated, to the animal life 10 for its sustenance. Although the water input to electrolyzer 15 could be taken from several other portions of the system, it seems preferable to extract the water for electrolysis from separator 16, an element in the system wherein water is extracted for other purposes as well. Energy to operate the electrolyzer 15 is introduced from generator 17 which, although shown as a separate source of electrical supply, may derive its power from the same ultimate source as does generator 12 or may in fact be identical with source 12. The source of radiation shown generally at 14 will usually prove to be the sun itself, although under certain circumstances, to be discussed below, it may be desirable to supply some portion of the utilized radiation from an artificial source.

The preferred chemosynthetic organism, Hydrogenomonas, consumes the gases hydrogen, oxygen, and carbon dioxide in varying molar ratios which may be represented by the following simplified equations:

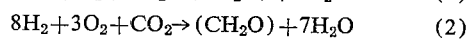

$$4H_2 + O_2 + CO_2 \rightarrow (CH_2O) + 3H_2O \quad (1)$$
$$8H_2 + 3O_2 + CO_2 \rightarrow (CH_2O) + 7H_2O \quad (2)$$

In these equations the expression ($CH_2O$) symbolizes the complete bacterium, including carbohydrates and other substances suited as animal foods. Nitrogen-bearing compounds also enter into the metabolism of the bacterium, of course, and appear within the life structure of the organism as proteins. The energy to support the metabolism of hydrogen bacteria is derived from the oxyhydrogen reaction with or without the presence of light. In a closed ecology such as that described herein, a chemosynthetic hydrogen-assimilating organism, when supplied with molecular hydrogen and molecular oxygen from the electrolysis of water, is capable of removing carbon dioxide from the atmosphere, and converting it with other substances into food. In the practice of this invention a definite relationship is established between the chemosynthetic conversion and the photosynthetic conversion.

During periods of ample ambient solar radiation, the symbiotic suspension is controlled in such a manner that the chemosynthetic and the photosynthetic organisms are permitted to grow at approximately equal rates. That is, radiation is permitted to illuminate the mixture from source 14 to stimulate and support the growth of the algae, and simultaneously hydrogen is supplied to the suspension from electrolyzer 15 to sustain the growth of the hydrogen bacteria. The oxygen released by the algae or other photosynthetic organisms is consumed within the suspension 13 by the hydrogen bacteria in accordance with the symbolic Equations 1 and 2 above. At such times all of the oxygen released by the electrolyzer 15 is supplied to the animal life to sustain it. Under such conditions the proportions between the chemosynthetic and photosynthetic organisms will tend to stabilize at approximately fixed percentages and a balanced, mixed culture will result. During these periods the electrical energy input from sources such as generator 17 would be approximately half of that which would be required if the system operated only chemosynthetically. The growth rate of the organisms with suspension 13 is controlled at such times largely by the light input.

When the intensity of ambient solar radiation decreases, as in a transition period between light and darkness, the growth rate of the algae will decrease gradually. In order to maintain the same total rate of carbon dioxide conversion and food production, the chemosynthetic conversion rate is increased. Such an increase in conversion is obtained by increasing the rate of electrolysis in the variable rate electrolyzer 15 and supplying not only the additional hydrogen so produced, but also the excess oxygen so produced to the symbiotic suspension 13. Valves 18 and 19 interposed respectively in the hydrogen and oxygen lines leading from the electrolyzer 15 to the symbiotic suspension 13 represent symbolically the variability of oxygen and hydrogen supply to the suspension. As the chemosynthetic conversion rate is increased, the population density of photosynthetic organisms in the suspension will decrease. During periods of total darkness no photosynthesis would occur and the closed ecology would be balanced entirely by the chemosynthetic conversion. In such periods the total amount of algae or other photosynthetic organisms in the suspension will decline almost to 0 because of the fact that fractions of the suspension are periodically introduced into the separator and no new algae are produced to take the place of that which has been extracted.

In a subsequent transition period from dark to ample ambient solar radiation, the suspension can be reinoculated with algae set aside for this purpose and the cycle can be continued in the manner discussed above. A life support system of the described nature utilizing both photosynthesis and chemosynthesis can be used very profitably under conditions of long dark-light cycles. Such a system provides for the utilization of ambient natural radiation when it is available and, when it is not available, makes use of the highly efficient chemosynthetic conversion The energy input required for such a system in dark periods is approximately one-tenth the energy input which would be required to produce light from artificial sources to sustain a wholly photosynthetic food production system of equal food production capacity. This is not to say that it would not be desirable to include some artificial light sources in the system for auxiliary purposes. For example, it may be desirable during dark periods to provide a small separate supply of photosynthetic organisms illuminated from an artificial light source so that there will always be a viable source of supply of algae to reinoculate the symbiotic suspension upon the return of ample ambient radiation.

The animal life 10 included in the described system is of course intended to include man. Man can and does subsist on algae in certain parts of the world, and it is recognized that microorganisms, including bacteria, form part of the human diet. Even in a system severely limited by space and transportable mass parameters, however, there are reasons why it may be desirable to enrich the diet of humans within the system beyond what can be provided from a mixture of algae and digestible bacteria alone, however such a mixture may be subsequently treated. Not all of the reasons are physiological. Psychological factors play a significant role in determining what is and what is not palatable to the human taste. Hence, it may be desirable to include in the system an intermediate form of animal life as part of animal life 10 to feed upon the foods separated from the symbiotic suspension and to serve in turn as food for the man or men in the system. Indeed, the system described may form part of a larger and more complex ecological cycle. The contribution which the ecological system described and claimed herein may make to the operation of a larger system will nevertheless be made in a highly efficient manner.

The system shown and described is obviously capable of incorporating a large number of variations in the details of its execution which would be apparent to those skilled in the art to which the invention pertains. The appended claims are therefore intended to cover all such variations as fall within the true spirit and scope of the invention in its broader aspects.

What we claim as new and desire to secure by Letters Patent of the United States is:

1. A closed ecological system for the support of animal life therein comprising:
   a symbiotic culture container for an aqueous symbiotic culture of (1) chemosynthetic hydrogen oxidizing bacteria of the genus Hydrogenomonas capable of using the energy derived from the oxyhydrogen reaction to metabolize carbon dioxide and (2) an oxygen evolving photosynthetic algae capable of using radiant energy for the metabolism of carbon dioxide;
   an electrochemical waste decomposer to receive and decompose the waste products from said animal life;
   means for supplying to said symbiotic culture said decomposed waste products from said decomposer;
   means for separating water and portions of said symbiotic culture for use as a food supply to said animal life contained within said system;
   means for electrolyzing water within said system to produce oxygen and hydrogen;
   means for supplying oxygen from said electrolyzing means to said animal life for respiration purposes;
   means for supplying hydrogen from said electrolyzing means to said symbiotic culture to support growth of said chemosynthetic bacteria;
   means for radiating said symbiotic culture to support growth of said photosynthetic algae; and
   means for increasing the rate of hydrogen supply and for supplying oxygen to said symbiotic culture during periods of low radiation availability.

2. A closed ecological system for the support of animal life therein comprising:
   a symbiotic culture container for an aqueous symbiotic culture of (1) chemosynthetic hydrogen oxidizing bacteria selected from the group consisting of *Hydrogenomonas pantotropha, Hydrogenomonas eutropha* and *Hydrogenomonas tacitus* capable of using the energy derived from the oxyhydrogen reaction to metabolize carbon dioxide and (2) an oxygen evolving photosynthetic algae capable of using radiant energy for the metabolism of carbon dioxide;
   an electrochemical waste decomposer to receive and decompose the waste products from said animal life;
   means for supplying to said symbiotic culture carbon dioxide from said animal life and said decomposed waste products from said decomposer;
   means for separating water and portions of said symbiotic culture as a source of food and water for said animal life;
   means for electrolyzing water within said system to release molecular oxygen and hydrogen;
   means for supplying molecular oxygen from said electrolyzing means to said animal life for purposes of respiration;
   means for supplying molecular hydrogen to said symbiotic culture to support the growth of the said bacteria;
   means for exposing said symbiotic culture to ambient solar radiation to support the growth of said algae;
   means for increasing the rate of supply of molecular hydrogen to said symbiotic culture during periods of reduced availability of radiation to increase the growth rate of said bacteria.

3. A closed ecological system for the support of animal life therein comprising:
   a symbiotic culture container for an aqueous symbiotic culture of (1) chemosynthetic hydrogen oxidizing bacteria of the genus Hydrogenomonas capable of using the energy derived from the oxyhydrogen reaction to metabolize carbon dioxide and (2) an oxygen evolving photosynthetic algae capable of using radiant energy for the metabolism of carbon dioxide;
   an electrochemical waste decomposer to receive and decompose the waste products from said animal life;
   means for supplying to said symbiotic culture carbon dioxide from said animal life and said decomposed waste products from said decomposer;
   means for separating from said symbiotic culture water and portions thereof as a source of food and water for said animal life;
   means for electrolyzing water within said system to release molecular oxygen and hydrogen;
   means for supplying molecular oxygen from said electrolyzing means to said animal life for purposes of respiration;
   means for supplying molecular hydrogen to said symbiotic culture to support the growth of the said bacteria;
   means for exposing said symbiotic culture to ambient solar radiation to support the growth of said algae;
   means for increasing the rate of supply of molecular hydrogen to said symbiotic culture during periods of reduced availability of radiation to increase the growth rate of said bacteria.

4. The method of supporting animal life in a closed environment which comprises:
   mixing in aqueous suspension a culture of (1) chemosynthetic hydrogen oxidizing bacteria of the genus Hydrogenomonas capable of using the energy derived from the oxyhydrogen reaction to metabolize hydrogen, carbon dioxide, and oxygen and (2) oxygen evolving photosynthetic algae capable of using radiant energy for the conversion of carbon dioxide and water into organic compounds and oxygen;
   electrochemically decomposing the waste products from said animal life;
   introducing into said culture said decomposed waste products;
   separating from said culture water and portions thereof as water and food for said animal life;

exposing said culture to natural radiation to support the growth of said photosynthetic algae;
electrolyzing water within said system;
supplying oxygen from the electrolysis of said water to said animal life for respiration purposes;
supplying hydrogen from the electrolysis of said water to said culture to support the growth of said chemosynthetic hydrogen oxidizing bacteria; and
increasing the rate of supply of hydrogen and supplying oxygen to said suspension during periods of decreased radiation intensity to increase the rate of growth of said chemosynthetic hydrogen oxidizing bacteria.

5. The method of supporting animal life in a closed environment which comprises:
mixing in aqueous suspension a culture of (1) oxygen evolving photosynthetic algae for the conversion of carbon dioxide to organic compounds by the use of radiant energy and (2) chemosynthetic hydrogen oxidizing bacteria of the genus Hydrogenomonas capable of converting carbon dioxide to organic compounds by the use of energy derived from the oxyhydrogen reaction;
electrochemically decomposing the waste products from said animal life;
introducing into said culture carbon dioxide and said decomposed waste products to provide a nutrient medium;
separating from said culture water and portions thereof as water and food for said animal life;
exposing said culture to naturally occurring radiation to support the growth of said algae;
electrolyzing water within said system to produce molecular oxygen and molecular hydrogen;
supplying oxygen from the electrolysis of said water to said animal life for respiration purposes;
supplying hydrogen to said culture to support the growth of said bacteria; and
increasing the rate of supply of hydrogen to said culture during periods of decreased radiation intensity, and supplying additional oxygen to said culture to increase the growth rate of said bacteria during such periods.

References Cited
UNITED STATES PATENTS

| | | | |
|---|---|---|---|
| 3,228,856 | 1/1966 | Federle | 195—102 |
| 3,243,918 | 4/1966 | Machiedo | 47—1.4 |

ALVIN E. TANENHOLTZ, *Primary Examiner.*

U.S. Cl. X.R.

195—104, 127; 47—1.4